(12) United States Patent
Myers et al.

(10) Patent No.: US 8,833,804 B2
(45) Date of Patent: Sep. 16, 2014

(54) HAMMER UNION ASSEMBLY, HAMMER UNION SEAL THEREFOR AND METHOD OF CONSTRUCTING A HAMMER UNION SEAL

(75) Inventors: Michael J. Myers, Van Wert, OH (US); Douglas E. Chase, West Bloomfield, MI (US); Gerald A. Greca, Carleton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/594,765

(22) Filed: Aug. 24, 2012

(65) Prior Publication Data

US 2014/0054888 A1 Feb. 27, 2014

(51) Int. Cl.
*F16L 17/00* (2006.01)

(52) U.S. Cl.
USPC .......................................... 285/354; 277/638

(58) Field of Classification Search
USPC .......... 285/111, 104, 354; 277/608, 584, 611, 277/368
See application file for complete search history.

(56) References Cited

U.S. PATENT DOCUMENTS

| | | | |
|---|---|---|---|
| 2,330,197 A * | 9/1943 | Allen et al. | 285/111 |
| 2,469,851 A * | 5/1949 | Stecher et al. | 285/104 |
| 2,486,451 A | 11/1949 | Warren | |
| 3,282,594 A | 11/1966 | Wheeler | |
| 3,521,892 A | 7/1970 | Sheesley et al. | |
| 3,531,133 A | 9/1970 | Sheesley et al. | |
| 4,147,368 A | 4/1979 | Baker et al. | |
| 4,219,204 A * | 8/1980 | Pippert | 277/584 |
| 4,239,242 A | 12/1980 | Burns | |
| 4,379,558 A | 4/1983 | Pippert | |
| 4,403,795 A | 9/1983 | Davlin | |
| 4,451,364 A | 5/1984 | Higgins et al. | |
| 4,493,373 A | 1/1985 | Jackson | |
| 4,919,456 A | 4/1990 | Wong | |
| H0000945 H * | 8/1991 | Taliaferro et al. | 285/354 |
| 5,306,021 A | 4/1994 | Morvant | |
| 6,899,358 B2 | 5/2005 | Richardson | |
| 6,945,569 B1 | 9/2005 | Diaz et al. | |
| 7,055,829 B2 | 6/2006 | Russell | |
| 7,125,055 B2 | 10/2006 | Dallas | |
| 7,195,288 B2 | 3/2007 | Weinhold | |
| 2004/0026873 A1 | 2/2004 | Davey | |
| 2005/0067791 A1 | 3/2005 | Bock et al. | |
| 2006/0220327 A1 | 10/2006 | Russell | |
| 2006/0232019 A1 | 10/2006 | Garrison et al. | |
| 2007/0228667 A1 | 10/2007 | Zivi | |
| 2007/0290454 A1 | 12/2007 | Garrison et al. | |

FOREIGN PATENT DOCUMENTS

GB 2282422 A 4/1995

OTHER PUBLICATIONS

International Search Report mailed Oct. 30, 2013 (PCT/US2013/055677).

* cited by examiner

*Primary Examiner* — Aaron Dunwoody
(74) *Attorney, Agent, or Firm* — Robert L. Stearns; Dickinson Wright, PLLC

(57) ABSTRACT

A hammer union seal assembly, hammer union seal and method of construction thereof is provided. The method of constructing the hammer union seal includes forming an annular rubber ring having a cylindrical inner surface and a cylindrical outer surface, with the cylindrical outer surface extending between opposite corner edges. The method further includes forming an annular steel ring. Then, recessing and bonding the annular steel ring in one of the corner edges with an outer surface of the steel ring remaining exposed.

5 Claims, 2 Drawing Sheets

HAMMER UNION ASSEMBLY, HAMMER UNION SEAL THEREFOR AND METHOD OF CONSTRUCTING A HAMMER UNION SEAL

BACKGROUND OF THE INVENTION

1. Technical Field

This invention relates generally to static seals, and more particularly to hammer union assemblies and static seals therefor and to methods of constructing the static seals.

2. Related Art

A hammer union seal typically has four component parts, including a male part, a female part, a union nut and an elastomeric seal. The female part has an inner tapered female end and an externally threaded portion adjacent the tapered female end. An annular counterbore extends axially inwardly from the inner tapered female end to provide a pocket in which the elastomeric seal is positioned. The male part has an outer conical surface, sometimes referred to as nose, configured for sealed engagement with the tapered end of the female part, and a radially outwardly extending flange adjacent the nose. The nut has a radially inwardly extending flange adjacent one end and internal female threads adjacent an opposite end. The nut is slipped over the male part to bring the flange of the nut into abutment with the flange of the male part, such that the two flanges confront each other axially. Then, the female threads of the nut are threaded on the external threads of the female part, thereby drawing the male and female parts axially toward one another, and thus, forming a primary seal between the mating nose and tapered surface and forming a secondary seal via the elastomeric seal as it is compressed between the male and female parts.

SUMMARY OF THE INVENTION

In accordance with one aspect of the invention, a method of constructing a hammer union seal is provided. The method includes forming an annular rubber ring having a cylindrical inner surface and a cylindrical outer surface, the cylindrical outer surface extending between opposite corner edges. Further, forming an annular steel ring and recessing and bonding the annular steel ring in one of the corner edges with an outer surface of the steel ring remaining exposed.

In accordance with another aspect of method, the method includes forming the annular steel ring by welding opposite ends of the wire to one another.

In accordance with one aspect of the invention, a hammer union seal is provided. The seal includes an annular rubber ring having a cylindrical inner surface and a cylindrical outer surface, the cylindrical outer surface extending between opposite corner edges. Further, an annular steel ring is recessed and bonded in one of the corner edges with an outer surface of the steel ring being exposed.

In accordance with one aspect of the invention, a hammer union assembly is provided. The assembly includes an annular first member having a male end with an outer conical surface and a radially outwardly extending flange adjacent the male end. Further, the assembly includes an annular second member part having a female end with an inner tapered surface configured for sealed engagement with the outer conical surface of the first member. The second member has an externally threaded portion adjacent the female end with an annular counterbore extending axially inwardly from the female end to provide a pocket. Further yet, assembly includes a nut having internal female threads configured for threaded engagement with the externally threaded portion of the second member having a radially inwardly extending flange configured to confront the radially outwardly extending flange of the first member. The assembly further includes an annular elastomeric seal disposed in the counterbore of the second member. The seal includes an annular rubber ring having a cylindrical inner surface and a cylindrical outer surface. The cylindrical outer surface extends between opposite corner edges with an annular steel ring recessed and bonded in one of the corner edges, with an outer surface of the steel ring being exposed.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
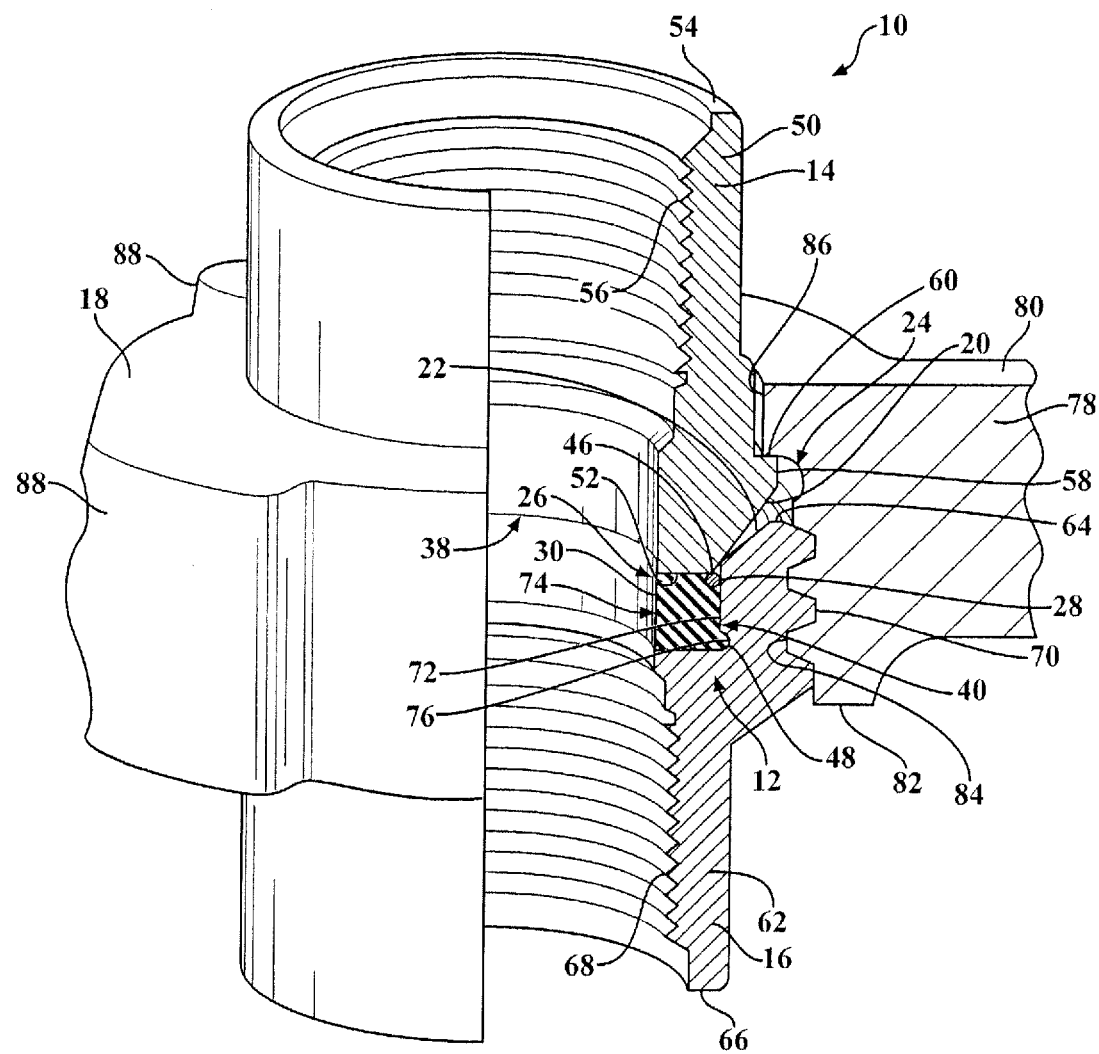
FIG. 1 is a partially sectioned view of a hammer union assembly constructed in accordance with one aspect of the invention.
Figure 2:
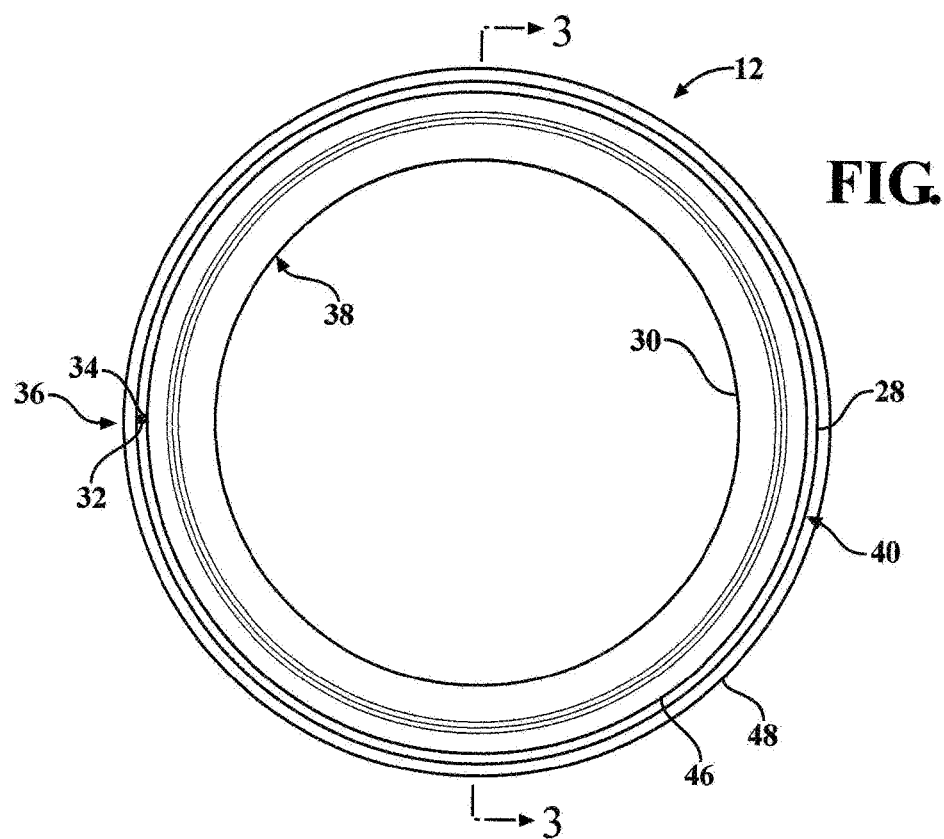
FIG. 2 is a plan view of a hammer union seal of the assembly of FIG. 1.
Figure 3:
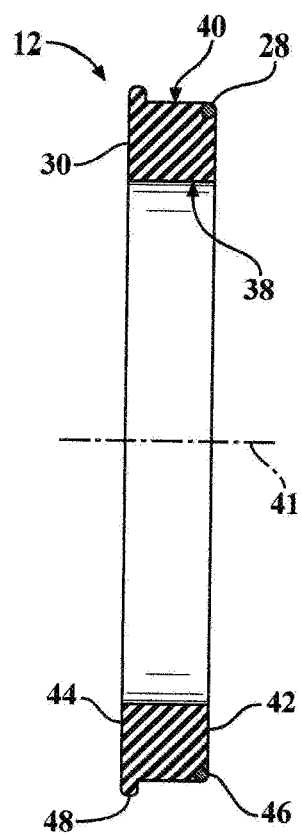
FIG. 3 is a cross-sectional view of the hammer union seal taken generally along the line 3-3 of FIG. 2.

Referring in more detail to the drawings, FIG. 1 illustrates a hammer union assembly 10 including a hammer union seal 12 constructed in accordance with one aspect of the invention. The hammer union assembly 10 further includes an annular first member 14, sometimes referred to as a male part, that is brought into sealed relation with the an annular second member 16, sometimes referred to as a female part. To facilitate forming an air/liquid tight seal between the male and female parts 14, 16, a nut 18 is slipping over the male part 14 and threaded onto the female part 16, thereby drawing respective tapered surfaces 20, 22 of the male and female parts 14, 16 into sealed abutment with one another, thereby forming a primary seal joint 24 between the male and female parts 14, 16. In addition to forming the primary seal joint 24, a secondary seal joint 26 is formed by the axial compression of the hammer union seal 12 between the male and female parts 14, 16. To facilitate maintaining the integrity of the secondary seal joint 26, the hammer union seal 12 includes an annular steel ring 28 recessed and bonded in an annular elastomeric body 30 of the hammer union seal 12. The annular steel ring 28 contributes to the economical manufacture of the seal 12, given the steel ring 28 is formed from steel wire that is bent into it annular configuration, with opposite ends 32, 34 of the steel wire being subsequently fixed together at bond joint 36, such as via a welding operation that forms a weld joint.

The annular elastomeric body 30 has a cylindrical inner surface 38 and a cylindrical outer surface 40 extending axially along a central axis 41 between opposite faces 42, 44. The cylindrical outer surface 40 transitions to one face 42 at a corner edge 46 and to the other face 44 via an annular lip 48 that extends radially outwardly from the outer surface 40. The cylindrical inner surface 38 has a cylindrical shape that extends from one face 42 to the opposite face 44. The elastomeric body 30 is formed of rubber, such as nitrile.

The male part 14 has a generally cylindrical body 50 that extends axially between opposite ends 52, 54. The body 50 is shown as having an inner threaded region 56 to facilitate joining the male part 14 to a segment of pipe (not shown). One end 52, sometimes referred to as the male end or nose, includes the outer tapered surface 20, shown as being conical, and a radially outwardly extending flange 58 adjacent the male end 52. The flange 58 provides a radially extending shoulder 60 sized to confront the female part 16 during assembly.

The female part 16 has a tubular body 62 that extends axially between opposite ends 64, 66. The body 62 is shown as having an inner threaded region 68 to facilitate joining the female part 16 to a segment of pipe (not shown). One end 64, sometimes referred to as the female end, includes the inner tapered surface 22, shown as being conical, wherein the inner tapered surface 22 is sized and configured for sealed engagement with the outer conical surface 20 of the male part 14, thereby forming the primary seal joint 24. The female part 16 has an externally threaded portion 70, shown as being adjacent the female end 64, with an annular counterbore 72 extending axially inwardly from the female end 64 to provide an annular seal pocket 74. The seal pocket 74 is shown as having a radially outwardly extending annular groove 76 at a base of the pocket 74 that is sized for a close, and preferably tight, fit of the lip 48 to facilitate retaining the hammer union seal 12 in the pocket such that the female part 16, with seal 12 disposed therein, can be handled without fear of the seal 12 falling out of the pocket 74.

The nut 18 has a tubular body 78 that extends axially between opposite ends 80, 82. The body 78 is shown as having internal female threads 84 configured for threaded engagement with the externally threaded portion or region 68 of the female part 16. The nut 18 further includes a radially inwardly extending flange 86, shown as being adjacent one end 80, configured to confront the radially outwardly extending flange 58 of the male part 14, with the remaining inner portion of the body 78 being sized to slip freely over and about the male part 14. To facilitate tightening the nut 18, the body 78 is shown having at least one, and preferably a plurality of radially outwardly extending protrusions, also referred to as ears 88.

During assembly, with the nut 18 being disposed about the male part 14 and the seal 12 disposed in the pocket 74 of the female part 16, the threads 84 of the nut 18 are threaded onto the threaded region 56 of the female part 16. As the nut 18 is tightened on female part 16, such as by forcefully hammering the ears 88, the flange 86 of the nut 18 forcefully confronts the flange 58 of the male part 14 along an axial direction, thereby causing the male part 14 and female part 16 to be drawn axially toward one another. As the tightening continues, the primary seal joint 24 is established by mating contact between the respective tapered surfaces 20, 22 of the male part 14 and female part 16, and further, the elastomeric body 30 of the hammer union seal 12 is axially compressed to form the secondary seal joint 26. During axial compression of the elastomeric body 30, the steel ring 28 ensures the brought into seal abutment with the cylindrical surface of the pocket 74 while also promoting seal integrity established by the elastomeric body 30 by maintaining the desired configuration thereof. It should be understood that any radial forces applied to the steel ring 28 are withstood by the bond joint 36 of the steel ring 28, thereby ensuring the steel ring 28 retains its circumferentially closed hoop strength in use.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A method of constructing a hammer union seal, comprising:
   forming an annular elastomeric body having a cylindrical inner surface and a cylindrical outer surface, the cylindrical outer surface extending between opposite faces with the cylindrical outer surface transitioning to one of the opposite faces at a corner edge and transitioning to the other of the opposite faces via an annular lip that extends radially outwardly from the cylindrical outer surface;
   forming an annular steel ring from a single loop of wire and welding opposite ends of the wire to one another; and
   recessing and bonding the annular steel ring in the corner edge with an outer surface of the steel ring remaining exposed.

2. The method of claim 1 further including molding the annular elastomeric body to the annular steel ring.

3. A hammer union seal, comprising:
   an annular elastomeric body having a cylindrical inner surface and a cylindrical outer surface, the cylindrical outer surface extending between opposite faces with said cylindrical outer surface transitioning to one of said opposite faces at a corner edge; and
   an annular steel ring having opposite ends joined together by a weld joint, said steel ring being recessed and bonded in said corner edge and transitioning to the other of the opposite faces via an annular lip that extends radially outwardly from the cylindrical outer surface with an outer surface of said steel ring being exposed.

4. The hammer union seal of claim 3 wherein said steel ring is formed from a single loop of wire.

5. A hammer union assembly, comprising:
   an annular first member having a male end with an outer conical surface and a radially outwardly extending flange adjacent the male end;
   an annular second member part having a female end with an inner tapered surface configured for sealed engagement with said outer conical surface of said first member, said second member having an externally threaded portion adjacent said female end with an annular counterbore extending axially inwardly from said female end to provide a pocket;
   a nut having internal female threads configured for threaded engagement with said externally threaded portion of said second member having a radially inwardly extending flange configured to confront said radially outwardly extending flange of said first member; and
   an annular elastomeric seal disposed in said counterbore of said second member, said seal including an annular elastomeric body having a cylindrical inner surface and a cylindrical outer surface, said cylindrical outer surface extending between opposite faces with said cylindrical outer surface transitioning to one of said opposite faces at a corner edge and transitioning to the other of the opposite faces via an annular lip that extends radially outwardly from the cylindrical outer surface, with an annular steel ring formed from a single loop of wire having opposite ends welded to one another by a weld joint, said steel ring being recessed and bonded in said corner edge with an outer surface of said steel ring being exposed.

* * * * *